No. 682,627. Patented Sept. 17, 1901.
E. H. MACK.
DEVICE FOR FEEDING AND WATERING POULTRY.
(Application filed Apr. 13, 1901.)
(No Model.)

Witnesses

E. H. Mack, Inventor
by C. A. Snow & Co.
Attorneys

UNITED STATES PATENT OFFICE.

ERNEST HERMON MACK, OF KEUKA COLLEGE, NEW YORK.

DEVICE FOR FEEDING AND WATERING POULTRY.

SPECIFICATION forming part of Letters Patent No. 682,627, dated September 17, 1901.

Application filed April 13, 1901. Serial No. 55,730. (No model.)

*To all whom it may concern:*

Be it known that I, ERNEST HERMON MACK, a citizen of the United States, residing at Keuka College, in the county of Yates and State of New York, have invented a new and useful Device for Feeding and Watering Poultry, of which the following is a specification.

The invention relates to improvements in devices for feeding and watering poultry.

One object of the present invention is to improve the construction of devices for feeding and watering poultry and to provide a simple, inexpensive, and efficient one which will always be upright, clean, and ready for use and which will afford each fowl equal access to its contents and prevent them from interfering with one another.

A further object of the invention is to provide a device of this character adapted in a great measure to prevent the food from being scattered outside and from being soiled by the fowl; and another object of the invention is to prevent the device from being used as a perch and to provide means for heating the water in cold weather.

The invention consists in the construction and novel combination and arrangement of parts hereinafter fully described, illustrated in the accompanying drawings, and pointed out in the claims hereto appended.

Figure 1:
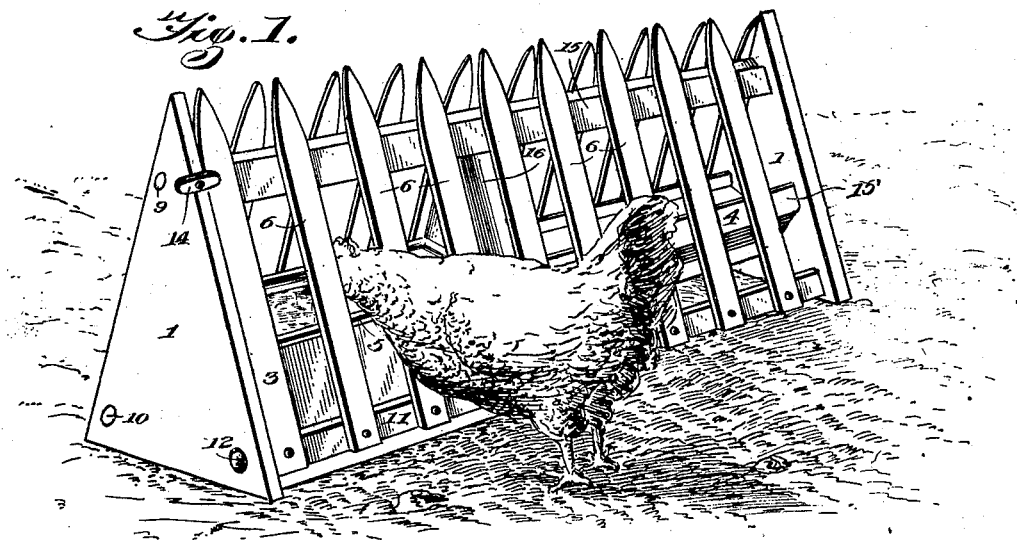
Figure 2:
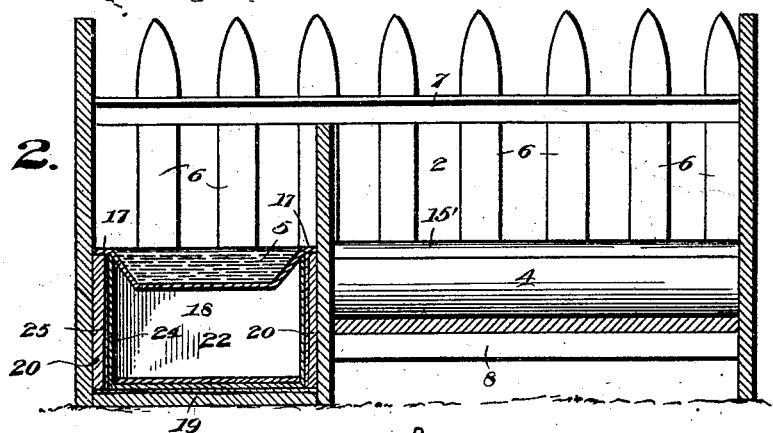
Figure 3:
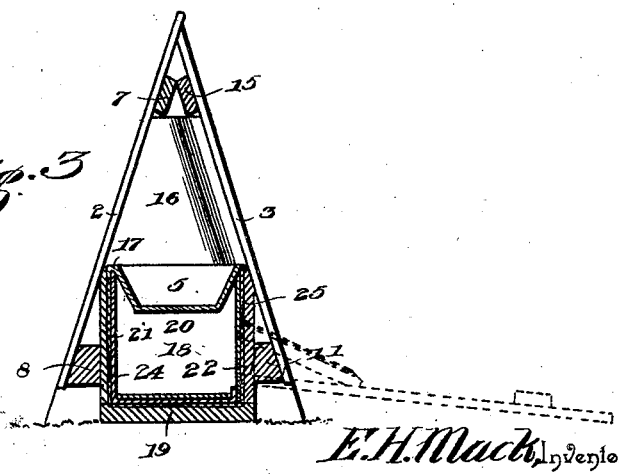

In the drawings, Figure 1 is a perspective view of a device for feeding and watering poultry constructed in accordance with this invention. Fig. 2 is a longitudinal sectional view of the same. Fig. 3 is a transverse sectional view.

Like numerals of reference designate corresponding parts in all the figures of the drawings.

1 1 designate vertical triangular ends of a guard or inclosure, which is provided with inclined sides 2 and 3 and which is adapted to contain a feed-trough 4 and a watering trough or receptacle 5. The triangular end walls are preferably solid, as illustrated in Fig. 1, and the sides are preferably composed of pickets 6 and suitable longitudinal connecting-bars. The side 2 is rigid with the ends 1, and its upper and lower longitudinal bars 7 and 8 have their ends reduced to form tenons 9 and 10, which are arranged in suitable openings or mortises of the ends 1, as clearly indicated in Fig. 1. The other side 3 is provided at the ends of its lower horizontal bar 11 with journals 12, forming pivots or pintles and arranged in bearing-openings of the ends 1, and the said side, which is secured in its closed position by a pivoted button 14, is adapted to be swung outward, as indicated in dotted lines in Fig. 3 of the accompanying drawings, to afford access to its interior. The upper longitudinal bar 15 of the side 3 abuts against the inner faces of the ends 1 and terminates thereat. The pickets of the two sides 2 and 3 are alternately arranged, the pickets of one side being located opposite the spaces or intervals between the pickets of the other side. By this construction the sides of the frame or inclosure are divided into spaces to provide openings for affording access to the drinking and feed troughs, and by this alternate arrangement of pickets the poultry at one side will not interfere with that at the other. Each opening or space is of a size to accommodate only one fowl, and each fowl will thereby be afforded an equal opportunity to obtain access to the contents of the device and will be prevented from interfering with the others.

The feed-trough 4 is substantially V-shaped in cross-section, and it is provided at the upper edges of its inclined sides with inwardly-inclined flanges 15', which are adapted in a great measure to prevent the food from being scattered outside the trough. One end of the trough is supported by one of the ends of the frame or inclosure, and its other end is secured to an intermediate support or partition 16, secured to the fixed side of the frame or inclosure and preferably located at a point between the center and one of the ends of the same; but the feed-trough and the drinking-trough may be of any desired size. The drinking trough or receptacle, which is constructed of sheet metal or other suitable material, is preferably provided with inclined walls adapted, should its contents freeze, to permit the same to expand without injuring it, and it is provided with horizontal supporting-flanges 17, arranged upon the upper edges of a box, forming a heating chamber or compartment 18. The box which forms the heating-compartment is composed of a bottom 19, end walls 20, and side walls 21 and 22, the side wall 22 being secured to and carried by the hinged side of the frame or inclosure, whereby when the hinged side is swung outward the box will be opened to afford access to its interior. The box is provided with a lining 24, of sheet metal or other suitable material, and a lining 25, of asbestos, heavy paper, or other suitable material, is interposed between the sheet-metal lining or facing and the walls of the box and the bottom of the same. A mat of asbestos may be arranged on the bottom of the box to receive a hot brick, water-bag, or the like, which is adapted to heat the water within the drinking-trough in cold weather; but a lamp or any other suitable heating device may be employed for this purpose. The drinking-trough may be omitted or it may be used without the feed-trough.

The pickets are pointed at the top and effectually prevent the device from being used as a perch.

The device may be constructed of any desired size, and it affords a broad base and is adapted to rest securely upon the ground or other supporting-surface and will always remain in an upright position, clean and ready for use. It is adapted to protect the food and water, it will prevent the same from being scattered around outside of it, and it will afford each fowl, whether large or small, an equal opportunity to obtain access to its contents without the others interfering with it. The hinged side is adapted to be readily let down, and it will afford access to the interior of the device, to the feed-trough, to the drinking-trough, and to the heating-compartment of the box or casing.

It will be seen that the device for feeding and watering poultry is exceedingly simple and inexpensive in construction, that it possesses great strength and durability, and that it may be employed advantageously as a combined feeding and drinking trough or separately as a feeding or drinking trough. The feeding and watering device may be constructed of a size to permit it to be employed for feeding stock, such as sheep and other animals, and when so used the points formed by the upper ends of the pickets are unnecessary.

What I claim is—

1. A device of the class described comprising the triangular ends, the inclined rigid side fixed to the ends and composed of horizontal bars and upright pickets, the movable side hinged at its bottom to the triangular ends and adapted to swing downward and outward and abutting against and supported by the upper portion of the stationary side, a fastening device for locking the movable side in its closed position, a box mounted within the frame and having one of its sides secured to and carried by the hinged side and adapted to receive a heating device, and a drinking trough or receptacle forming a cover for the box and resting upon the upper edges of the same, substantially as described.

2. A device of the class described comprising a frame or inclosure having a hinged side, a box mounted within the frame or inclosure and having one of its sides mounted on the hinged side of the frame or inclosure, said box being provided with a lining and being adapted to receive a heating device, and a drinking trough or receptacle provided with a marginal flange arranged upon the box or casing, substantially as described.

3. A device of the class described comprising a frame composed of triangular ends and having inclined fixed and movable sides composed of horizontal bars and upright pickets, the movable side being hinged at its bottom to the ends and having its upper portion abutting against and supported by the top portion of the fixed sides, an intermediate support or partition connected with the fixed side, a feed-trough arranged between the support or partition and one end of the frame or inclosure, a box or casing arranged at the opposite side of the support or partition and having one of its walls mounted on the hinged side of the frame or inclosure, and a drinking trough or receptacle supported upon the box or casing, substantially as described.

In testimony that I claim the foregoing as my own I have hereto affixed my signature in the presence of two witnesses.

ERNEST HERMON MACK.

Witnesses:
FRANK T. BROWN,
R. L. ROSE.